(No Model.)
A. W. MILES.
METHOD OF MAKING NUT LOCK WASHERS.
No. 506,923.  Patented Oct. 17, 1893.
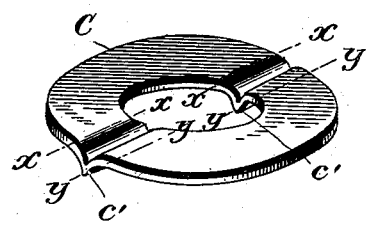
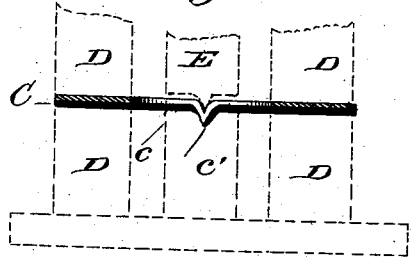
Witnesses:
L. C. Hills.
E. H. Bond
Inventor:
Arthur W. Miles,
by E. B. Stocking
Attorney.

UNITED STATES PATENT OFFICE.

ARTHUR W. MILES, OF LIVINGSTON, MONTANA.

METHOD OF MAKING NUT-LOCK WASHERS.

SPECIFICATION forming part of Letters Patent No. 506,923, dated October 17, 1893.

Application filed March 25, 1893. Serial No. 467,533. (No model.)

*To all whom it may concern:*

Be it known that I, ARTHUR W. MILES, a citizen of the United States, residing at Livingston, in the county of Park, State of Montana, have invented certain new and useful Improvements in Methods of Making Nut-Lock Washers, of which the following is a specification, reference being had therein to the accompanying drawings.

This invention relates to certain new and useful improvements in methods of making nut-lock washers of that class involving a bendable washer, and it has for its objects among others to provide an improved washer of this character having projections or ribs to serve as a means for preventing turning of the washer and holding it in its adjusted position. I form the washer of sheet metal, and by a novel method form the ribs or projections thereon; the ribs or projections are made by stretching the metal by suitable means or devices without materiallly altering the size or shape of the blank from which the washer is constructed. The ribs or projections may extend from the bolt opening to the periphery of the washer, or only a portion of the distance from either point. The washer is simple and cheap of manufacture, and the formation of the ribs or projections gives to them a taper which facilitates their entrance into the wood with which they are brought in contact.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which—

Figure 1 is a perspective view of a washer formed by my improved method. Fig. 2 is a view showing the manner of forming the washer seen in Fig. 1.

Like letters of reference indicate like parts throughout the several views in which they appear.

In carrying out my invention I take a sheet metal washer C with a bolt hole $c$, the washer being of the size and shape desired for the completed article; it is then placed between suitable dies or other devices D which hold the main and outer portions of the washer against movement or stretching and then by a suitable die E stretch the metal upon diametrically opposite sides of the bolt opening to form the ribs or projections $c'$; by this latter step the metal is stretched only say from between the points designated by the dotted lines $x$—$x$ and $y$—$y$ in Fig. 1. The metal is thus made thinner at these ribs or projections and although brought to a taper at the apex of the rib, is separated at the base or part joined to the main portion or face of the washer as seen in Fig. 1. The metal of the rib is tapered as the apex is approached in contradistinction to a rib formed by crimping. It will be seen that by this method the washer remains of the same size as before it is submitted to the action of the dies, the ribs being formed by the stretching of the metal at the desired points.

What I claim as new is—

The method of forming ribs on a thin metal washer which consists in holding the main portion of the washer against stretching and stretching the material between the held portions to form the ribs without altering the general contour of the washer, substantially as specified.

In testimony whereof I affix my signature in presence of two witnesses.

ARTHUR W. MILES.

Witnesses:
 HEATH SUTHERLAND,
 E. H. BOND.